(12) United States Patent
Kormann et al.

(10) Patent No.: US 9,742,754 B2
(45) Date of Patent: Aug. 22, 2017

(54) METHODS, SYSTEMS, AND PRODUCTS FOR AUTHENTICATING USERS

(71) Applicant: AT&T Intellectual Property I, L.P., Atlanta, GA (US)

(72) Inventors: David Kormann, Morristown, NJ (US); William Roberts Cheswick, Bernardeville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1 day.

(21) Appl. No.: 14/465,956

(22) Filed: Aug. 22, 2014

(65) Prior Publication Data

US 2014/0366115 A1 Dec. 11, 2014

Related U.S. Application Data

(63) Continuation of application No. 12/833,028, filed on Jul. 9, 2010, now Pat. No. 8,832,810.

(51) Int. Cl.
| | |
|---|---|
| *H04L 29/06* | (2006.01) |
| *G06F 21/36* | (2013.01) |
| *G06F 21/31* | (2013.01) |
| *G01S 19/14* | (2010.01) |
| *G06F 21/32* | (2013.01) |

(52) U.S. Cl.
CPC .............. *H04L 63/08* (2013.01); *G01S 19/14* (2013.01); *G06F 21/31* (2013.01); *G06F 21/32* (2013.01); *G06F 21/36* (2013.01); *H04L 63/083* (2013.01)

(58) Field of Classification Search
CPC ..... G06F 21/31; G06F 21/36; G06K 9/00268; G06K 9/00221; G06K 9/00885; G06K 9/00892; H04L 63/0861
See application file for complete search history.

(56) References Cited

U.S. PATENT DOCUMENTS

| | | |
|---|---|---|
| 5,559,961 A | 9/1996 | Blonder |
| 5,922,073 A | 7/1999 | Shimada |
| 6,192,478 B1 | 2/2001 | Elledge |
| 6,370,629 B1 | 4/2002 | Hastings et al. |
| 6,862,687 B1 | 3/2005 | Suzuki |
| 6,963,659 B2 | 11/2005 | Tumey et al. |
| 7,000,116 B2 | 2/2006 | Bates et al. |
| 7,162,475 B2 | 1/2007 | Ackerman |
| 7,174,459 B2 | 2/2007 | Kirkpatrick et al. |
| 7,174,462 B2 | 2/2007 | Pering et al. |
| 7,243,239 B2 | 7/2007 | Kirovski et al. |
| 7,376,899 B2 | 5/2008 | Mantyla |
| 7,412,717 B2 | 8/2008 | Fukuda et al. |
| 7,451,323 B2 | 11/2008 | Abe et al. |
| 7,536,556 B2 | 5/2009 | Fedorova et al. |

(Continued)

*Primary Examiner* — Tae Kim
(74) *Attorney, Agent, or Firm* — Scott P. Zimmerman, PLLC

(57) ABSTRACT

Methods, systems, and products authenticate a user to a device. A user selects or submits a media file for authentication. Features in the media file are compared to a set of criteria for authentication. The number of matching criteria, that is within a range of values for each criterion in the set of criteria, is determined. The number of matching criteria is compared to a threshold value. When the number of matching criteria equals or exceeds the threshold value, then the user that selected or submitted the media file is authenticated.

6 Claims, 17 Drawing Sheets

(56) References Cited

U.S. PATENT DOCUMENTS

| | | |
|---|---|---|
| 7,644,433 B2 | 1/2010 | Mizrah |
| 7,844,825 B1 | 11/2010 | Neginsky |
| 7,953,983 B2 | 5/2011 | Holt et al. |
| 7,958,359 B2 | 6/2011 | Sharma et al. |
| 8,024,359 B2 | 9/2011 | Rathus et al. |
| 8,024,775 B2 | 9/2011 | Xu et al. |
| 8,458,485 B2 | 6/2013 | Bandyopadhyay et al. |
| 8,542,879 B1 * | 9/2013 | Nechyba ............ G06K 9/00228 382/103 |
| 2001/0037468 A1 | 11/2001 | Gaddis |
| 2002/0113687 A1 | 8/2002 | Center et al. |
| 2003/0085997 A1 | 5/2003 | Takagi et al. |
| 2003/0158815 A1 | 8/2003 | Yoshida et al. |
| 2004/0034801 A1 | 2/2004 | Jaeger |
| 2004/0093527 A1 | 5/2004 | Pering et al. |
| 2004/0230843 A1 | 11/2004 | Jansen |
| 2005/0010785 A1 | 1/2005 | Abe et al. |
| 2005/0207622 A1 | 9/2005 | Haupt et al. |
| 2006/0080743 A1 | 4/2006 | Zhu et al. |
| 2006/0206717 A1 | 9/2006 | Holt et al. |
| 2006/0218627 A1 * | 9/2006 | Komatsu ............... G06F 21/43 726/5 |
| 2006/0285663 A1 | 12/2006 | Rathus et al. |
| 2008/0028205 A1 * | 1/2008 | Yang ..................... G06F 21/36 713/156 |
| 2008/0052245 A1 | 2/2008 | Love |
| 2008/0094417 A1 | 4/2008 | Cohen |
| 2008/0209223 A1 | 8/2008 | Nandy et al. |
| 2008/0209526 A1 * | 8/2008 | Varghese ............. H04L 9/3231 726/5 |
| 2008/0275748 A1 | 11/2008 | John |
| 2009/0037986 A1 * | 2/2009 | Baker ................... G06F 21/31 726/5 |
| 2009/0064321 A1 * | 3/2009 | Dick .................... H04L 63/107 726/21 |
| 2009/0073268 A1 | 3/2009 | Jung |
| 2009/0175509 A1 | 7/2009 | Gonion et al. |
| 2009/0328175 A1 * | 12/2009 | Shuster ................. G06F 21/36 726/7 |
| 2010/0050242 A1 | 2/2010 | Delia et al. |
| 2010/0257195 A1 | 10/2010 | Inoue et al. |
| 2010/0325721 A1 | 12/2010 | Bandyopadhyay et al. |
| 2011/0023063 A1 * | 1/2011 | McDonough ...... H04N 21/4316 725/46 |
| 2011/0072510 A1 | 3/2011 | Cheswick |
| 2011/0258680 A1 | 10/2011 | Rathus et al. |
| 2011/0314529 A1 * | 12/2011 | Bailey, Jr. ............. G06F 21/36 726/7 |
| 2011/0317872 A1 | 12/2011 | Free |
| 2012/0123786 A1 * | 5/2012 | Valin .................. G06Q 20/105 704/273 |

* cited by examiner

METHODS, SYSTEMS, AND PRODUCTS FOR AUTHENTICATING USERS

CROSS-REFERENCE TO RELATED APPLICATIONS

This application is a continuation of U.S. application Ser. No. 12/833,028 filed Jul. 9, 2010 and since issued as U.S. Pat. No. 8,832,810, and incorporated herein by reference in its entirety.

BACKGROUND

Exemplary embodiments generally relate to electrical computers, digital processing systems, and information security and, more particularly, to system access control based on user identification, password entry, authentication, and credentials.

Authentication is cumbersome. The most common authentication scheme requires knowledge information (e.g., usernames and passwords) to verify a user's identity. Usernames and passwords, though, are difficult to remember and are fraught with typing errors and with case-sensitive requirements. Better schemes for user authentication would be enormously beneficial.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
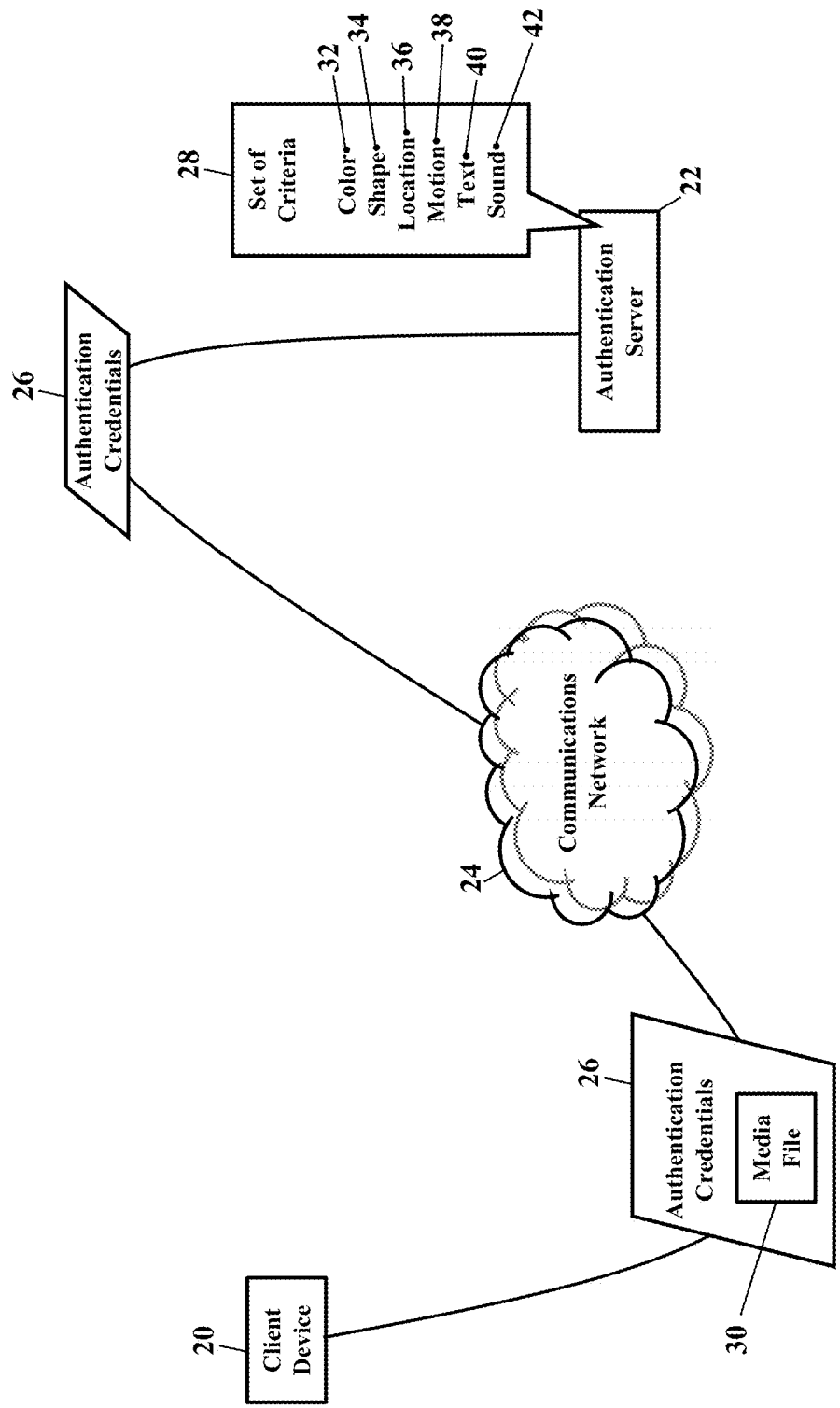
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that authenticates a user's identity. A client device 20 communicates with an authentication server 22 via a communications network 24. The client device 20 sends authentication credentials 26 to the authentication server 22. If the authentication credentials 26 satisfy some set 28 of criteria, then the client device 20 is authorized to access the authentication server 22. An identity of a user of the client device 20, in other words, is authenticated. If the authentication credentials 26 fail to satisfy the set 28 of criteria, then the client device 20 is not authorized to access the authentication server 22. The identity of the user of the client device 20 could not be verified.

Here, though, the authentication credentials 26 may include a media file 30. The media file 30 may comprise one or more pictures, movies, songs, sounds, text, or other audio visual data. When the authentication server 22 receives the media file 30, the media file 30 is compared to the set 28 of criteria. The set 28 of criteria specifies what features must be present in the media file 30 in order to authenticate the client device 20. The set 28 of criteria, for example, may include one or more color requirements 32, shape requirements 34, location requirements 36, motion requirements 38, text requirements 40, and sound requirements 42. The media file 30 is compared to the set 28 of criteria. When the media file 30 satisfies the set 28 of criteria, then the client device 20 may be authenticated.

Exemplary embodiments thus provide greater ease of use. The user of the client device 20 need only submit the media file 30 that satisfies the set 28 of criteria. The user need not remember yet another password, and the user need not struggle with tiny keys on tiny keypads on tiny displays. The user may create the media file 30 (such as by capturing a digital picture), or the user may select the media file 30 from a menu. Regardless, if the media file 30 satisfies the set 28 of criteria, then the client device 20 is authenticated. Exemplary embodiments thus provide a simpler and quicker method of authentication than cumbersome username and password schemes.

Exemplary embodiments, however, also provide greater security. The set 28 of criteria are preferably only known to the true user. Anyone creating, selecting, and/or submitting the media file 30 must know the specific requirements of the set 28 of criteria. The set 28 of criteria may be as simple, or as complex, as the user wishes to achieve a desired level of security. A single or double criterion may provide a low level of security, while several criteria provide a higher level of security. The set 28 of criteria, for example, may be simply configured to require that the color blue be present in the media file 30. If the media file 30 contains the color blue, then the client device 20 is authenticated to the authentication server 22. Such a simple criterion, however, could be present in many media files, so a more complex set 28 of criteria will likely be configured by most users. A more complicated set 28 of criteria may require that the media file 30 contain specific combinations of different hues. An even higher level of security may require that the media file 30 contain specific hues, a textual phrase (e.g., "Mary's car"), n number of vertical edges within an image, and a particular colleague's face. The user may even require a specific location requirements, such as GPS coordinates (as later paragraphs will explain). The set 28 of criteria, in other words, may be as simple, or as complex, as the user wishes to achieve a desired level of security. The user's objective is to configure the set 28 of criteria such that only a few media files, or even a single media file, can satisfy the set 28 of criteria. Moreover, because the set 28 of criteria are preferably configured by the user, only the user should know which media file 30 is capable of a successful authentication. If the media file 30 cannot satisfy the set 28 of criteria, then authentication may fail and the client device 20 may be denied access to the authentication server 22.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 2:
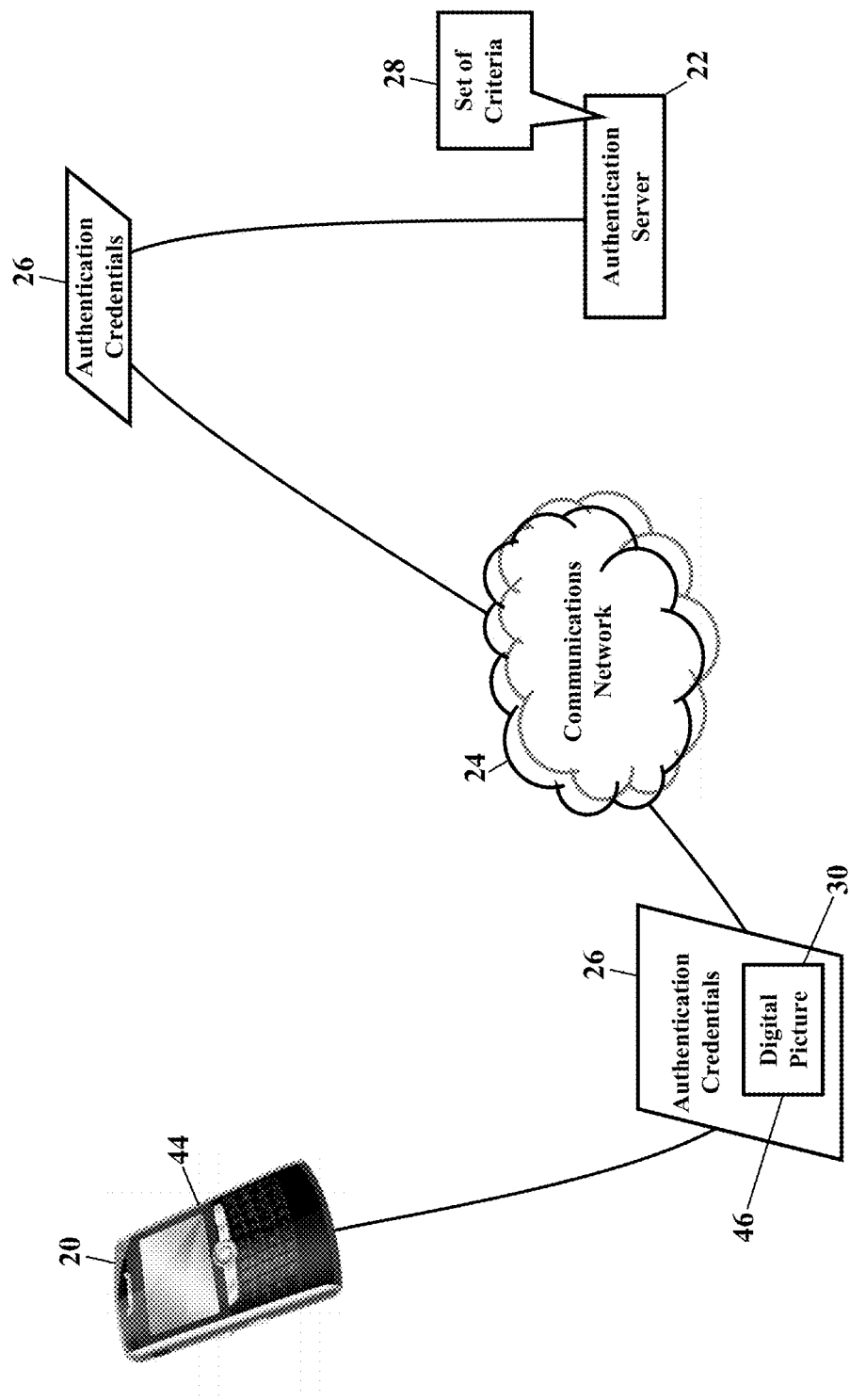
FIG. 2 is a simplified schematic illustrating a camera phone as another environment in which exemplary embodiments may be implemented.

FIG. 2 is another schematic illustrating the operating environment, according to exemplary embodiments. Here the client device 20 is illustrated as a camera phone 44. When the user of the camera phone 44 wishes to authenticate, the user captures a digital picture 46 as the media file 30. The user, in other words, takes a picture of a person, place, or thing that will sufficiently satisfy the set 28 of criteria to permit authentication. The user may even capture a movie and/or audio clip. Regardless, the camera phone 44 sends the digital picture 46 to the authentication server 22, and the authentication server 22 compares the digital picture 46 to the set 28 of criteria. If the digital picture 46 satisfies the set 28 of criteria, then the client device 20 (e.g., the camera phone 44) is authorized to access the authentication server 22. The user of the camera phone 44 is thus expected to know what content in the digital picture 44 will satisfy the set 28 of criteria required for authentication. Exemplary embodiments thus recognize that most people have camera phones and enjoy taking pictures. The authentication server 22 may even require creation of a unique digital picture 44 (or movie or audio clip) for each authentication attempt (as later paragraphs will explain).

Figure 3:
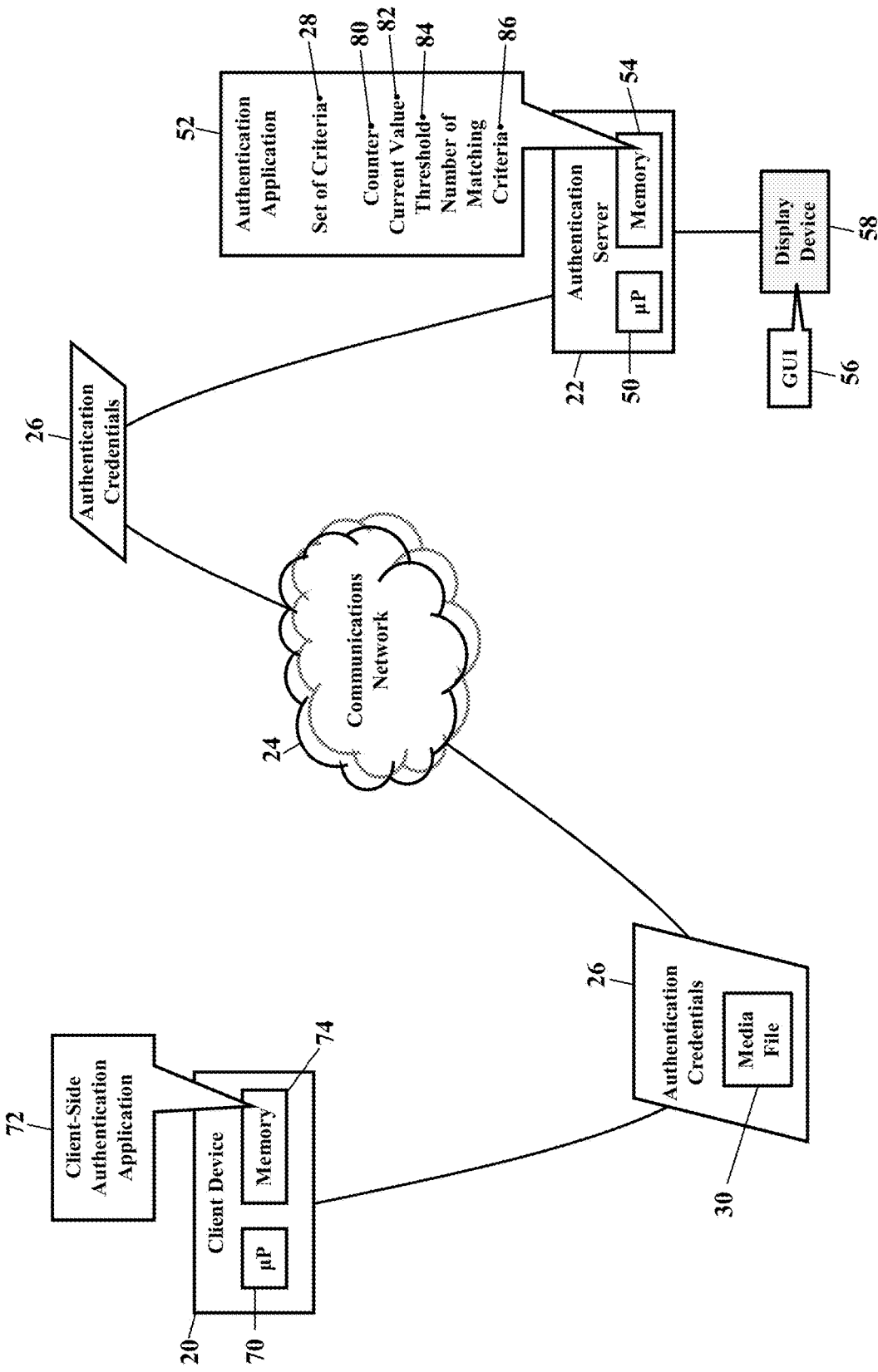
FIG. 3 is a more detailed schematic illustrating the operating environment, according to exemplary embodiments.

FIG. 3 is a more detailed schematic illustrating the operating environment, according to exemplary embodiments. Here the authentication server 22 has a processor 50 (e.g., "µP"), application specific integrated circuit (ASIC), or other component that executes an authentication application 52 stored in a memory 54. The authentication application 52 may cause the processor 50 to produce a graphical user interface ("GUI") 56. The graphical user interface 56 is illustrated as being visually produced on a display device 58, yet the graphical user interface 56 may also have audible features. The authentication application 52, however, may operate in any processor-controlled device, as later paragraphs will explain.

The client device 20 sends the authentication credentials 26 to the authentication server 22. The client device 20 has a processor 70 (e.g., "µP"), application specific integrated circuit (ASIC), or other component that executes a client-side authentication application 72 stored in a memory 74. The client-side authentication application 72 may cooperate with the authentication application 52 to send the media file 30 to an address in the communications network 24 that is associated with the authentication server 22.

The authentication application 52 then compares the media file 30 to the set 28 of criteria. The set 28 of criteria may include one or more of the color requirements 32, the shape requirements 34, the location requirements 36, the motion requirements 38, the text requirements 40, and the sound requirements 42 (all illustrated in FIG. 1). The authentication application 52 determines how many individual criterion, in the set 28 of criteria, are matched by the media file 30. The authentication application 52 may maintain a counter 80 in the memory 54 that sums the number of criteria that are matched to the media file 30. The counter 80 has an initial value (e.g., zero) that increments with each matching criterion. The authentication application 52 then compares a current value 82 of the counter 80 to a threshold value 84. The current value 82 of the counter 80 represents the number 86 of matching criteria that are satisfied by the media file 30. The threshold value 84 represents the minimum number of matching criteria that the media file 30 must satisfy. When the number 86 of matching criteria equals or exceeds the threshold value 84, then the authentication application 52 may authenticate the user (e.g., the client device 20) that submitted the media file 30. The authentication application 52 then resets the counter 80 to the initial value for the next authentication.

The authentication application 52 may require a strict match between the media file 30 and the set 28 of criteria. The user of the client device 20 may specify several criteria in the set 28 of criteria, and the user may require that each and every criterion be matched by the media file 30. In this strict case, then, the threshold value 84 equals the number of criteria in the set 28 of criteria. If any individual criterion is not matched to the media file 30, then authentication fails. The media file 30, in other words, must satisfy every individual criterion in the set 28 of criteria. If a complex set 28 of criteria must be exactly matched by the media file 30, then the user desires a high level of security. If the set 28 of criteria is complex and must be strictly matched, then perhaps only a single media file 30 in the world can successfully authenticate. This high level of security resembles a conventional password scheme in which only a single media file 30 in the world can authenticate. If the media file 30 is forgotten, inaccessible, or corrupted, then the client device 20 may not authenticate with the authentication server 22.

Such a high level of security, though, may not be desirable for all users. Many users will not want to remember, track, backup, and maintain a single media file 30 for authentication. Their security needs do not justify such strict requirements. Many users will prefer that the set 28 of criteria be configured such that only uniquely identifying traits or features in the media file 30 are needed for authentication. If the set 28 of criteria are configured to require a picture of a household pet, for example, then multiple media files may satisfy the set 28 of criteria. Even so, the chances of identity theft are still low. So many users may configure the set 28 of criteria such that multiple media files may successfully authenticate. If multiple media files may match the set 28 of criteria, but the user's security needs are still met, then ease of user may be preferable.

FIG. 3, then, also illustrates a lesser level of security. Here the media file 30 need not match each and every criterion in the set 28 of criteria. Even though the set 28 of criteria may still be complex, not every criterion must be matched. The authentication application 52 determines how many individual criterion, in the set 28 of criteria, are matched by the media file 30. The authentication application 52 may again maintain the counter 80 that sums the number of criteria that are matched to the media file 30. The counter 80 increments from the initial value (e.g., zero) with each matching criterion. The authentication application 52 then compares the current value 82 of the counter 80 to the threshold value 84. The user of the client device 20 configures the threshold value 84 to represent the minimum number of matching criteria that the media file 30 must satisfy. Even though the set 28 of criteria may be complex, with perhaps hundreds of individual criteria, not every criterion must be matched with the media file 30. The threshold value 84 may require that only a subset of the set 28 of criteria must be matched with the media file 30. When the current value 82 of the counter 80 equals or exceeds the threshold value 84, then the authentication application 52 authenticates the client device 20 and resets the counter 80 to the initial value for the next authentication.

The threshold value 84 may permit multiple media files to satisfy the set 28 of criteria. Again, though, this scenario may be acceptable to many users. Even though multiple media files may successfully authenticate, the chances of identity theft are still low. The threshold value 84, in other words, may provide adequate security while permitting much easier use.

Figure 4:
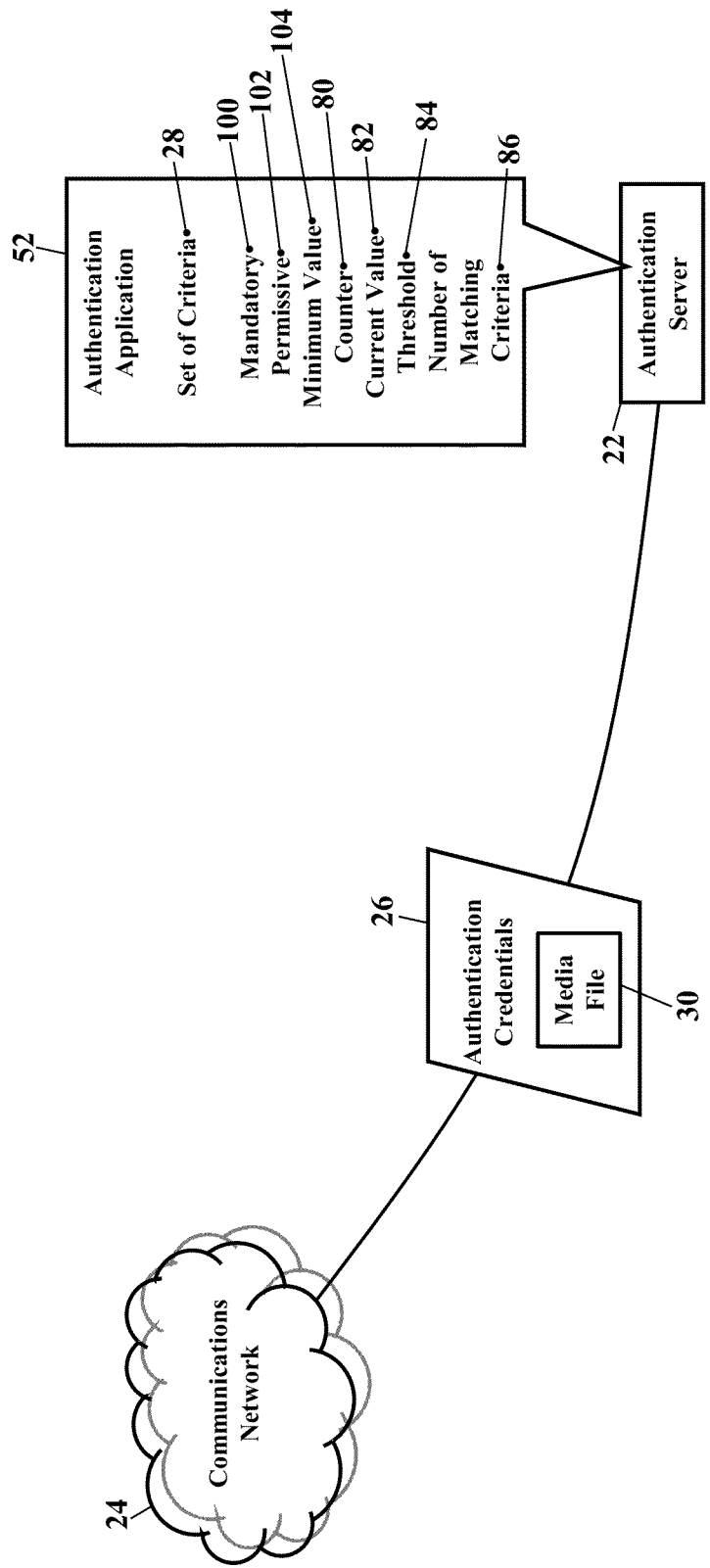
FIGS. 4 & 5 are detailed schematics illustrating an authentication application, according to exemplary embodiments.

FIG. 4 is a more detailed schematic illustrating the authentication application 52, according to exemplary embodiments. Here the set 28 of criteria may include mandatory 100 and permissive 102 criterion. If one or more mandatory criterion 100 are configured, then the media file 30 must satisfy or match each mandatory criterion 100. If the media file 30 fails to match any mandatory criterion 100, then the authentication application 52 may deny authentication. So, even though the number 86 of matching criteria may satisfy the threshold value 84, if the media file 30 fails to match any mandatory criterion 100, then the authentication application 52 may deny authentication. The media file 30, in other words, must strictly match each mandatory criterion 100. The authentication application 52, however, may be configured with discretion when comparing the permissive criterion 102. The media file 30 may, or may not, match each permissive criterion 102. If the media file 30 fails to match any permissive criterion 102, then the authentication application 52 may still permit authentication.

Authentication may thus require a combination of the mandatory criterion 100 and the permissive criterion 102. Because the media file 30 must match each mandatory criterion 100, the authentication application 52 may have no discretion to ignore a failed mandatory criterion 100. The authentication application 52, however, may have discretion when comparing the permissive criterion 102. The authentication application 52 may determine how many permissive criterion 102 are matched by the media file 30. The authentication application 52 may maintain and increment the counter 80 (as earlier paragraphs explained). The counter 80 sums the number of permissive criteria that are matched by the media file 30. The authentication application 52 then compares the current value 82 of the counter 80 to a minimum value 104. The minimum value 104 represents the minimum number of permissive criteria that the media file 30 must satisfy. If the media file 30 matches each and every mandatory criterion 100, and if the number of matching permissive criteria equals or exceeds the minimum value 104, then the authentication application 52 may authenticate the user of the client device 20 that selected the media file 30.

The mandatory criterion 100 and the permissive criterion 102 may increase security and ease of use. Each mandatory criterion 100 represents some audio, visual, or data feature that the media file 30 must possess. The user, for example, may configure the set 28 of criteria to require submission of an image of a household pet. The set 28 of criteria may thus be defined in terms that describe the colors, shapes, and features of the household pet. As long as the media file 30 includes those particular colors, shapes, and features that describe the household pet, then the one or more mandatory criterion 100 is matched. Other mandatory criterion 100 may require specific audio data, such as a song or sound (e.g., .mp3 or .wav data). The media file 30, for example, may need to possess data that matches a collegiate fight song or the sound of the household pet (such as the "bark" of a pet dog). If the media file 30 includes the mandatory audio data, then the mandatory criterion 100 is matched. The user may thus configure the set 28 of criteria to mandatorily require particular audio, visual, or data features for authentication. As long as the media file 30 possesses the required audio and/or visual data, then the mandatory criterion 100 is matched.

Exemplary embodiments thus permit fun, secure, and personalized authentication schemes. The user may thus personalize authentication by requiring combinations of data that only the user may possess. The user may configure the set 28 of criteria to authenticate after submission of the fun and unique media file 30. Pictures of grandkids, pets, favorite places, and favorite things may all be required as authentication credentials. Favorite songs, text phrases, and colors may also be required for authentication. A user, for example, may configure the set 28 of criteria to require the text phrase "America the Beautiful," overlaid onto an image of the Grand Canyon, along with audio data that matches the "Star Spangled Banner." The set 28 of criteria, of course, may be configured to require more random combinations of data that would be harder to successfully combine. The user may thus specify authentication schemes that are easier to remember, that are more secure than conventional passwords, and that are fun to configure.

Figure 5:
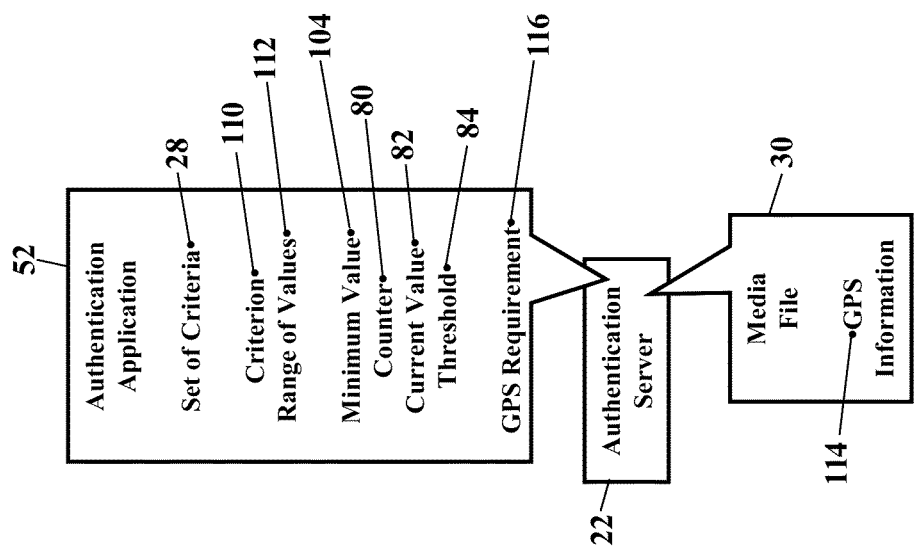

FIG. 5 is another detailed schematic illustrating the authentication application 52, according to exemplary embodiments. Here the set 28 of criteria may include data ranges that permit authentication. Each individual criterion 110 (in the set 28 of criteria) may have an associated or corresponding range 112 of values that are permissible for authentication. Few, if any, comparison and/or matching algorithms achieve an exact match. Rounding errors alone may produce differences in numerical comparisons. If the set 28 of criteria requires a vertical edge in an image, or the spoken word "foo," or the color blue, the match may always be an approximation. Each criterion 100 (in the set 28 of criteria) may thus be configured with the range 112 of values in which a match is considered to have occurred.

The location requirement (illustrated as reference numeral 36 in FIG. 1) provides another example. The location requirement 36 may specify that a numerical value for a required location must lie within a range of location values. Suppose the location requirement 36 specifies that the media file 30 must contain a particular object at a coordinate pair [x,y] from an origin [0,0], where x and y may be integer values in any units. The location requirement 36, however, may also have a corresponding range 112 of values that are defined as [x±10, y±15]. If the authentication application 52 determines that the media file 30 possess the particular object within the range 112 of values [x±10, y±15], then the location requirement 36 may be satisfied. Each criterion's range 112 of values may thus be an upper and a lower tolerance to each criterion 110. The authentication application 52 may determine how many criteria in the set 28 of criteria that are matched to their corresponding range 112 of values. As each criterion 110 is matched (within its corresponding range 112 of values), the authentication application 52 may increment the counter 80 and compare the current value 82 of the counter 80 to some required value (such as the threshold value 84 or the minimum value 104).

The location requirement 36 may also represent a physical geographic location. Many client devices have an application for obtaining Global Positioning System (GPS) coordinates. When the user's client device 20 captures the media file 30, the client-side authentication application (illustrated as reference numeral 72 in FIG. 3) may tag or embed the media file 30 with GPS information 114. When the authentication server 22 receives the media file 30, the authentication application 52 may then compare the GPS information 114 to the set 28 of criteria. Here, though, the set 28 of criteria may include a GPS requirement 116. If the GPS information 114 matches the GPS requirement 116 (perhaps within some tolerance of coordinates or radius), then the authentication application 52 may authenticate the client device 20. The GPS requirement 116 thus permits the user to configure some geographic location criteria for authentication. The user, for example, may require that the media file 30 (such as the digital picture 44 illustrated in FIG. 2) be captured in Ohio or within some radius of a previous authentication attempt. The authentication application 52 may thus maintain a log of authentication attempts, and each entry includes the GPS information 114 associated with each attempt. When the user authenticates, the user may require that the current GPS information 114 be within a particular radius of the GPS information 114 associated with an immediately preceding authentication attempt. If the current GPS information 114 is outside the required radius of the immediately preceding authentication attempt, then the authentication application 52 may deny authentication.

The log of authentication attempts may also prevent rogue replays of authentication. If an attacker could obtain a successful authentication attempt, the attacker could merely replay, or resubmit, the same authentication attempt, over-and-over. Exemplary embodiments may thus use the log of authentication attempts to guard against unscrupulous replaying. The log of authentication attempts may thus be stored in the authentication server 22 and provide a history of previous authentications. One or more previous authentications may affect future or subsequent authentication requests. When the client device 20 wishes to authenticate, the authentication application 52 may prohibit the exact same recognizers between successive authentications. If the set 28 of criteria requires an image of something red in Ohio, for example, then the same set 28 of criteria may not be used for a subsequent authentication attempt. The subsequent authentication attempt may require a vertical line and the face of a colleague. Exemplary embodiments, then, may randomly alter the set 28 of criteria after an authentication attempt. The authentication application 52 may even require that the authorized user change the set 28 of criteria after an authentication attempt. These dynamic changes help prevent rogue replays of authentication.

Figure 6:
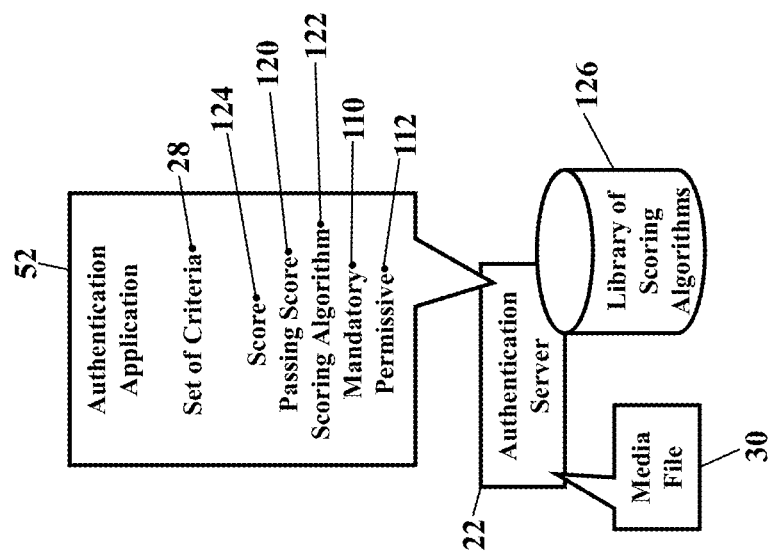
FIG. 6 is a detailed schematic illustrating a scoring algorithm, according to exemplary embodiments.

FIG. 6 is another detailed schematic illustrating the authentication application 52, according to exemplary embodiments. Here the authentication application 52 scores the media file 30 during authentication. If the media file 30 attains a passing score 120, then the client device 20 may be authenticated. As FIG. 6 illustrates, the authentication application 52 retrieves a scoring algorithm 122 from the memory 54. The scoring algorithm 122 includes terms that determine if the media file 30 attains the passing score 120. The scoring algorithm 122 uses the scoring algorithm 122 to calculate a score 124 and then compare the score to the passing score 120. For example, the passing score 120 may be defined in terms of some function $f$:

$$\text{Passing Score} \geq f(\text{sound, color, motion, content}),$$

where the scoring algorithm $f$ has terms related to the sound, color, motion, and content of the media file 30. A simple example of the scoring algorithm 122 would be a minimum percentage of the set 28 of criteria that are required for authentication. If the scoring algorithm 122 requires that at least ninety percent (90%) of the set 28 of criteria be matched, then perhaps any combination of permissive criteria that yields a 90% match results in a successful authentication.

The mandatory criterion 100 must be matched. If the scoring algorithm 122 includes the mandatory criterion 100, then the scoring algorithm 122 may be defined as Passing Score≥ƒ[set(mandatory criteria)+subset(permissive criteria)].

Here the entire set of mandatory criteria must be matched, but only a subset of the permissive criteria (in the set 28 of criteria) must be matched. The user may configure the scoring algorithm 122, for example, to only require some percentage (e.g., 20% or 50%) of the permissive criteria to be matched. As long as the entire set (e.g., 100%) of mandatory criteria are matched, any combination of the permissive criteria that yields the required percentage match results in a successful authentication.

The scoring algorithm 122 may be as simple, or as complex, as the user wishes. If the user desires a high level of security, then the user may want a complex scoring algorithm 122. Most users, however, may again feel that adequate security is attained by a simple scoring algorithm 122. The authentication application 52 may also include a library 126 of scoring algorithms. The library 126 of scoring algorithms provides predefined or "canned" scoring algorithms from which the user may choose. The library 126 of scoring algorithms is illustrated as being a database that is locally stored in the authentication server 22. The library 126 of scoring algorithms, however, may be remotely accessed and maintained at any location in communications network (illustrated as reference numeral 24 in FIG. 1). Regardless, the library 126 of scoring algorithms stores different scoring algorithms to permit greater personalization and different levels of security. The user may access the library 126 of scoring algorithms (perhaps via the graphical user interface 56 illustrated in FIG. 3) and select the scoring algorithm 122 that best suits their security needs.

Figure 7:
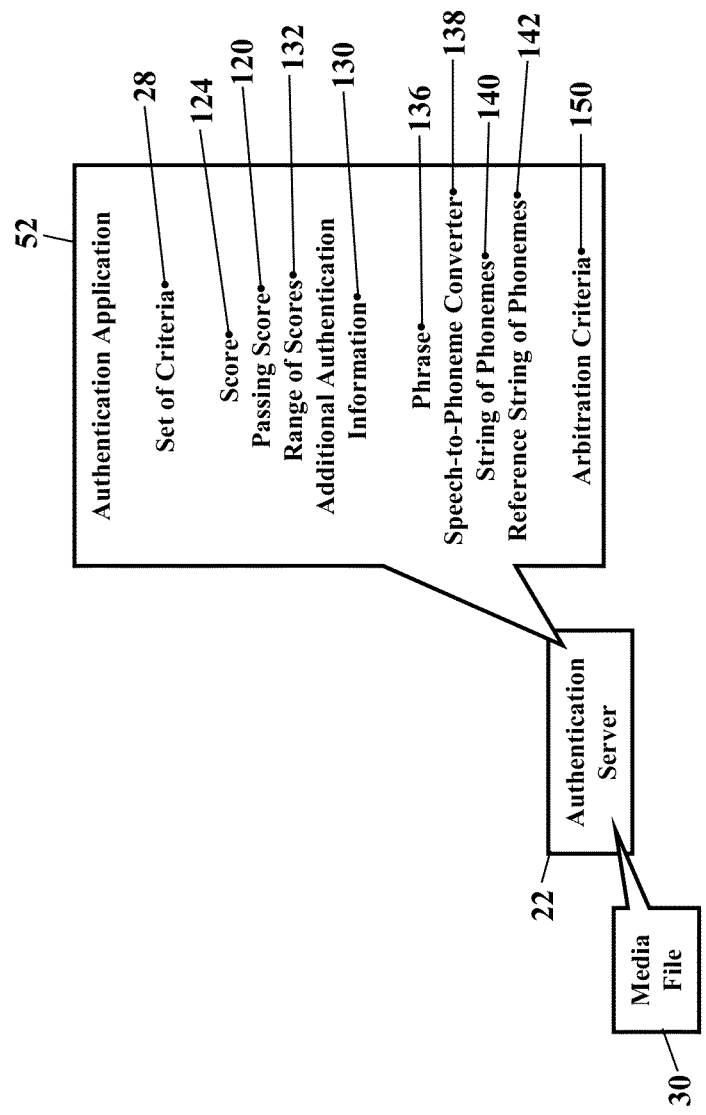
FIG. 7 is a schematic illustrating a failing score and supplemental authentication, according to exemplary embodiments.

FIG. 7 is a schematic illustrating a failing score, according to exemplary embodiments. When the authentication application 52 scores the media file 30, the media file 30 must attain the passing score 120 to authenticate the client device 20. If the media file 30 does not attain the passing score (that is, the score≤passing score), then authentication may fail. The user of the client device 20, in other words, must select and/or submit a different media file 30 to attain a higher score.

FIG. 7, though, illustrates a different scheme. Some users may prefer an option or logical branch that provides supplemental authentication. If the media file 30 has "just barely" failed, the authentication application 52 may be configured to request additional authentication information 130. As FIG. 7 illustrates, the authentication application 52 compares the final score 124 to the passing score 120. When the final score 124 is less than the passing score 120, the authentication application 52 may then compare the final score 124 to a range 132 of scores. The authentication application 52 may be configured to request the additional authentication information 130 when the media file's final score 124 is within the range 132 of scores. Suppose, for example, that the media file 30 attained a final score 124 of eighty three (83), but the passing score 120 is eighty six (86). Because the final score 124 is less than the passing score 120 (e.g., 83<86), the authentication application 52 may compare the final score 124 to the range 132 of scores. If the range 132 of scores is between eighty two (82) and eighty five (85), then the authentication application 52 may compare the final score 124 to the range 132 of scores (82≤final score≤85). Because the media file's final score 124 is within the range 132 of scores (e.g., 82≤83≤85), the authentication application 52 may request the additional authentication information 130. The media file's final score 124, in other words, "roughly" matches the required passing score 120, so perhaps authentication should not fail.

The additional authentication information 130 thus acts as an arbiter. When the media file's final score 124 is within the range 132 of scores, the authentication application 52 may request or retrieve the additional authentication information 130. The authentication application 52, for example, may request a spoken input to make a final determination. The authentication application 52 may request that the user speak a pre-registered phrase 136 into a microphone. The authentication application 52 may then invoke a speech-to-phoneme converter 138 to convert the user's spoken phrase 136 into a string 140 of phonemes. The authentication application 52 may then compare the string 140 of phonemes to a reference string 142 of phonemes. If the string 140 of phonemes matches the reference string 142 of phonemes, then the authentication application 52 may permit authentication, despite the failing final score 124. If the string 140 of phonemes does not match the reference string 142 of phonemes, then the authentication application 52 may finally deny authentication.

Other arbitration mechanisms may be used. The additional authentication information 130 may be based on arbitration criteria 150. When the media file's final score 124 is within the range 132 of scores, the authentication application 52 may request or retrieve the arbitration criteria 150. The authentication application 52 then compares the media file 30 to the arbitration criteria 150. The arbitration criteria 150 may include one or more "tie-breaker" requirements that the media file 30 must possess when the final score 124 "roughly" matches the required passing score 120. The authentication application 52 compares the audio and video data contained within the media file 30 to the arbitration criteria 150. Here, though, the authentication application 52 may require that the media file 30 match each and every arbitration criteria 150. A failure to match any arbitration criterion 150 may result in a denial of authentication.

Figure 8:
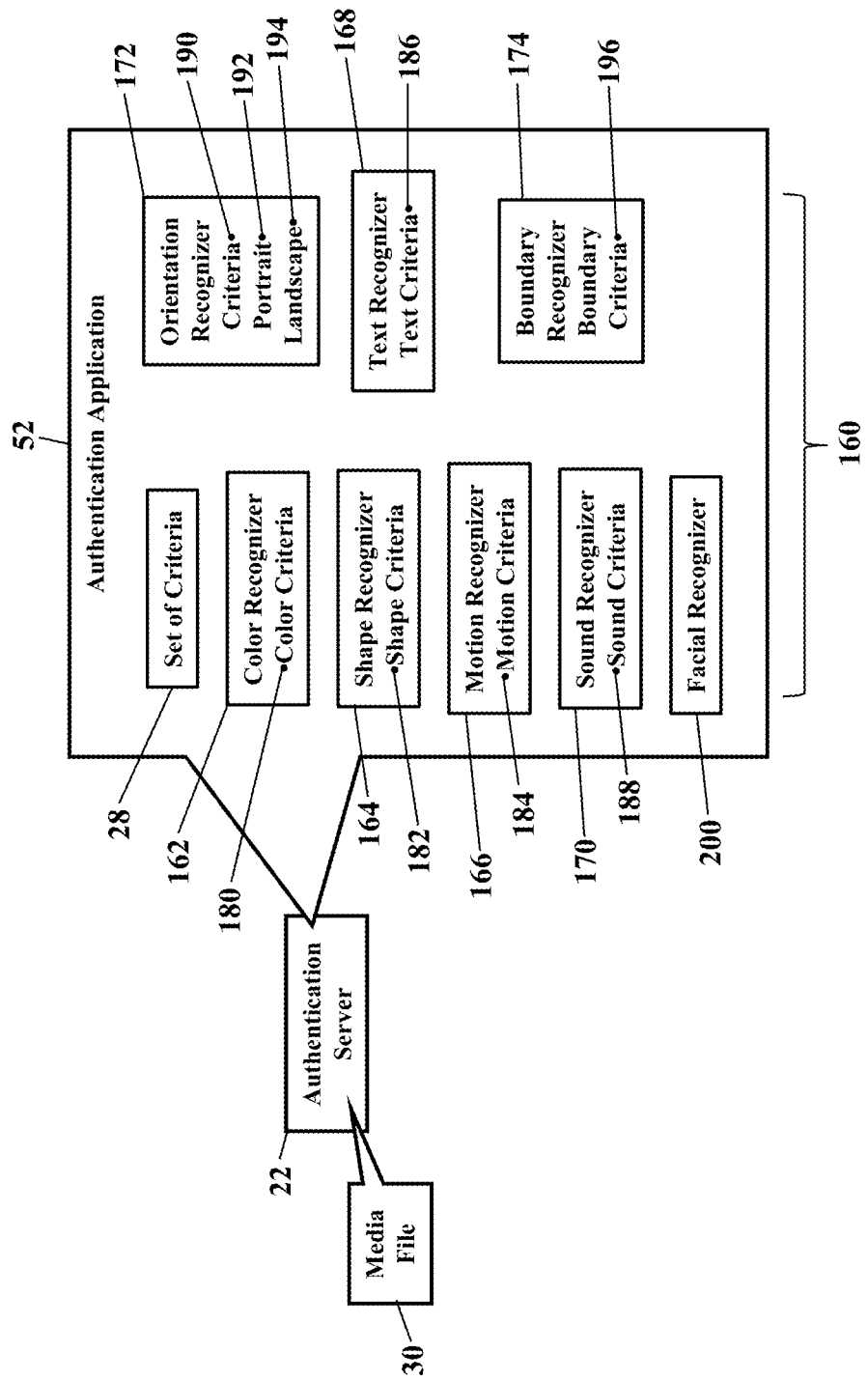
FIG. 8 is a schematic illustrating software componentry of the authentication application, according to exemplary embodiments.

FIG. 8 is a schematic illustrating software componentry of the authentication application 52, according to exemplary embodiments. As the above paragraphs explained, when the authentication server 22 receives the media file 30, the authentication application 52 compares the media file 30 to the set 28 of criteria. FIG. 8 illustrates various software recognizer modules 160 that the authentication application 52 may call or invoke when comparing the media file 30 to the set 28 of criteria. For ease of explanation, the software recognizer modules 160 are illustrated according to function. FIG. 8, for example, illustrates a color recognizer 162, a shape recognizer 164, a motion recognizer 166, a text recognizer 168, a sound recognizer 170, an orientation recognizer 172, and a boundary recognizer 174. The authentication application 52 may call or invoke one or more of these software recognizer modules 160 to determine if the features of the media file 30 match the set 28 of criteria.

The color recognizer 162 is used to recognize specific colors. The color recognizer 162 comprises code or instructions that may inspect the media file 30, or an image produced by the media file 30, for colors specified by the set 28 of criteria. The color recognizer 162, in particular, may inspect outputs generated by the media file 30 for numerical values assigned to colors. Each hue may be assigned a specific numerical value, so the color recognizer 162 inspects any numbers associated with colors. The color recognizer 162 may also determine whether an image contains a sufficient amount of a given color, as specified by the set 28 of criteria. If the color recognizer 162 encounters numerical values specified by color criteria 180 in the set 28 of criteria, then the color recognizer 162 may report a match to the authentication application 52.

The shape recognizer 164 is used to recognize specific shapes. The shape recognizer 164 also inspects the media file 30, or an output produced by the media file 30, for shapes specified by the set 28 of criteria. The shape recognizer 164 inspects the media file 30 for lines, two dimensional, and three dimensional shapes that may be mathematically specified by the set 28 of criteria. The shape recognizer 164, for example, may recognize straight and/or curved lines, horizontal and/or vertical lines, squares, circles, spheres, polygons, and any other two dimensional and three dimensional shapes. The shape recognizer 164 may even inspect the media file 30 for one-dimensional shapes (such as points or pixel values). If the shape recognizer 164 encounters any geometrical shape criteria 182 specified by the set 28 of criteria, then the shape recognizer 164 may report a match to the authentication application 52.

The motion recognizer 166 is used to recognize motion. The motion recognizer 166 inspects the media file 30, or an output produced by the media file 30, for any motion specified by the set 28 of criteria. The motion recognizer 166 may use timing changes and/or position changes between data points to detect motion. The motion recognizer 166 may compare sequential frames of video data to detect motion between frames. The motion recognizer 166 may additionally or alternatively compare a frame of video data to a reference frame of video data for differences in position or timing. If the motion recognizer 166 encounters motion criteria 184 specified by the set 28 of criteria, then the motion recognizer 166 may report a match to the authentication application 52.

The text recognizer 168 is used to recognize specific alphanumeric text. The text recognizer 168 inspects the media file 30, or an output produced by the media file 30, for words, numbers, or phrases specified by the set 28 of criteria. If the text recognizer 168 encounters some alphanumeric text criteria 186 that is specified by the set 28 of criteria, then the text recognizer 168 may report a match to the authentication application 52.

The sound recognizer 170 recognizes audio data. The sound recognizer 170 inspects the media file 30, or an output produced by the media file 30, for any audio sound data that is specified by the set 28 of criteria. The sound recognizer 170 may compare .mpg or .wav data files for data specified by the set 28 of criteria. The sound recognizer 170, for example, may compare a song produced by the media file 30 to sound criteria 188 that is specified by the set 28 of criteria. The sound recognizer 170 may also compare frequency waveforms (e.g., frequency and time data) to those frequencies and times specified by the set 28 of criteria. The sound recognizer 170 may also compare phonemes produced by the media file 30 to phonemes specified by the set 28 of criteria. The sound recognizer 170, for example, may call the speech-to-phoneme converter (illustrated as reference numeral 138 in FIG. 7) and convert a speech input into the string of phonemes (illustrated as reference numeral 140 in FIG. 7). The sound recognizer 170 may then compare the string 140 of phonemes to the phonemes specified by the sound criteria 188. However the sound recognizer 170 operates, if the sound recognizer 170 encounters the sound criteria 188 specified by the set 28 of criteria, then the sound recognizer 170 may report a match to the authentication application 52.

The orientation recognizer 172 is used to recognize an orientation of an output produced by the media file 30. The orientation recognizer 172 inspects the media file 30, or an output produced by the media file 30, for data representing orientation criteria 190 in the set 28 of criteria. The orientation recognizer 172, for example, may inspect an image or video produced by the media file 30 for a height and a width. If a height of the image or video is greater than the width, then the orientation recognizer 172 may report a portrait orientation 192. If the width of the image or video is greater than the height, then the orientation recognizer 172 may report a landscape orientation 194. Exemplary embodiments may use this simple and quick comparison to quickly filter or weed out media files that cannot authenticate. Exemplary embodiments, in other words, may use either the portrait orientation 192 or the landscape orientation 194 as the mandatory criterion (illustrated as reference numeral 100 in FIG. 4). The authentication application 52 may make a very quick preliminary comparison of page orientation to determine authentication. If the authentication application 52 determines that the page orientation does not match the orientation criteria 190 in the set 28 of criteria, then the authentication application 52 may deny authentication without performing other comparisons. If, however, the page orientation matches the orientation criteria 190, then the authentication application 52 may continue comparing the remaining set 28 of criteria.

The boundary recognizer 174 is used to recognize boundary data. The boundary recognizer 174 inspects the media file 30, or an output produced by the media file 30, for boundary criteria 196 specified by the set 28 of criteria. The boundary recognizer 174, for example, may determine boundaries between adjacent shapes and colors. The boundary recognizer 174 may recognize transitions from a color or hue to a different color or a different hue. The boundary recognizer 174 may recognize mathematical transitions from a shape to a different shape. The boundary recognizer 174 may also include an edge detector to verify that an image contains horizontal and/or vertical edges. The boundary recognizer 174, as another example, may verify at least n vertical edges, as specified by the set 28 of criteria, where n is some integer. If the boundary recognizer 174 encounters data specified by the set 28 of criteria, then the boundary recognizer 174 may report a match to the authentication application 52.

The software recognizer modules 160 may separately operate or may be combined. As the authentication application 52 evaluates the media file 30, the authentication application 52 may call or invoke a different one of the software recognizer modules 160 for each criterion in the set 28 of criteria. Or the authentication application 52 may call or invoke multiple software recognizer modules 160. Suppose the set 28 of criteria defines a human face of the user. The authentication application 52 could call a specialized facial recognizer 200 to determine if an image produced by the media file 30 satisfies the set 28 of criteria. The facial recognizer 200 may comprise special code to recognize facial traits specified by set 28 of criteria. The facial recognizer 200, in particular, may combine portions of the software recognizer modules 160 to recognize specific facial traits. Portions of the color recognizer 162, the shape recognizer 164, and the boundary recognizer 174, for example, may be combined to recognize specific facial traits.

Figure 9:
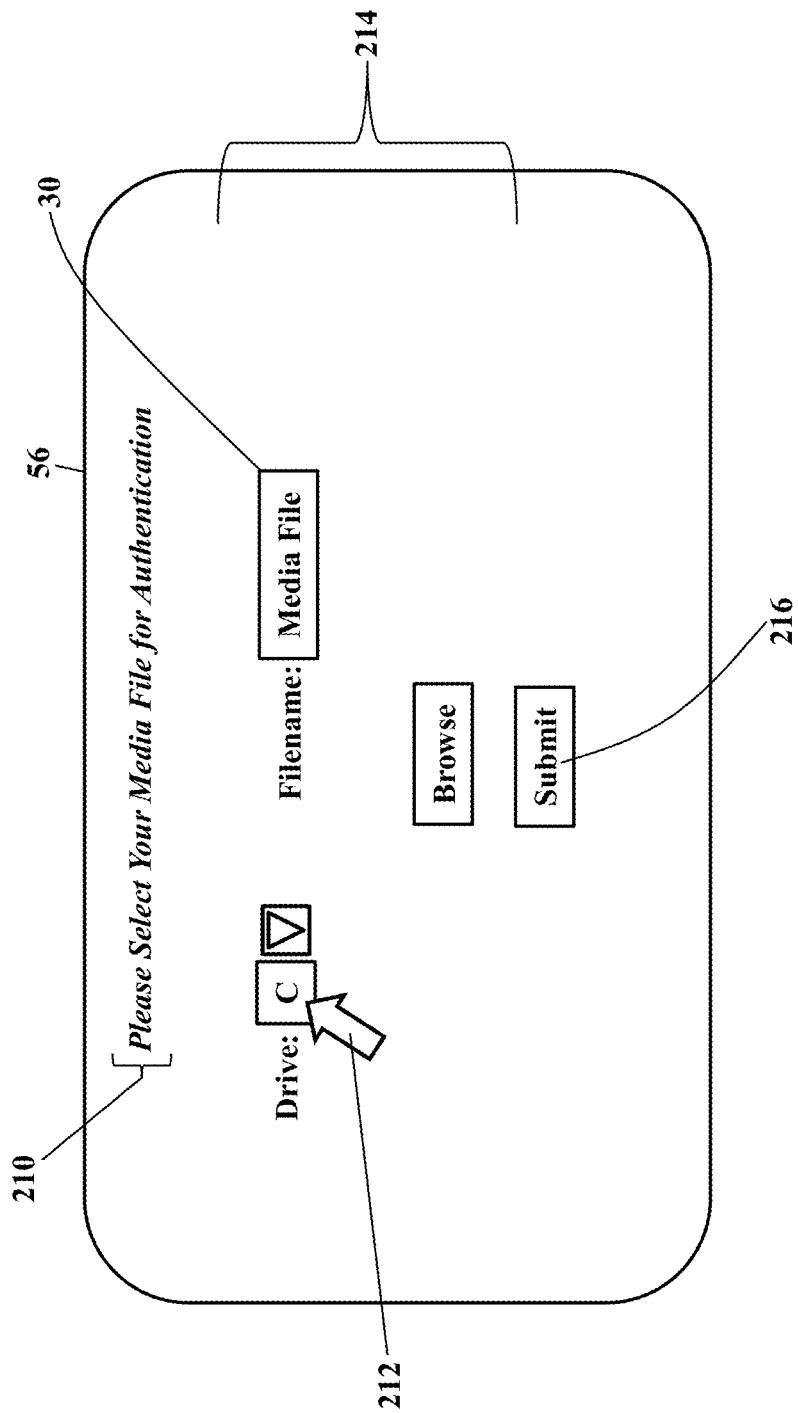
FIGS. 9 and 10 are schematics illustrating a graphical user interface, according to exemplary embodiments.
Figure 10:
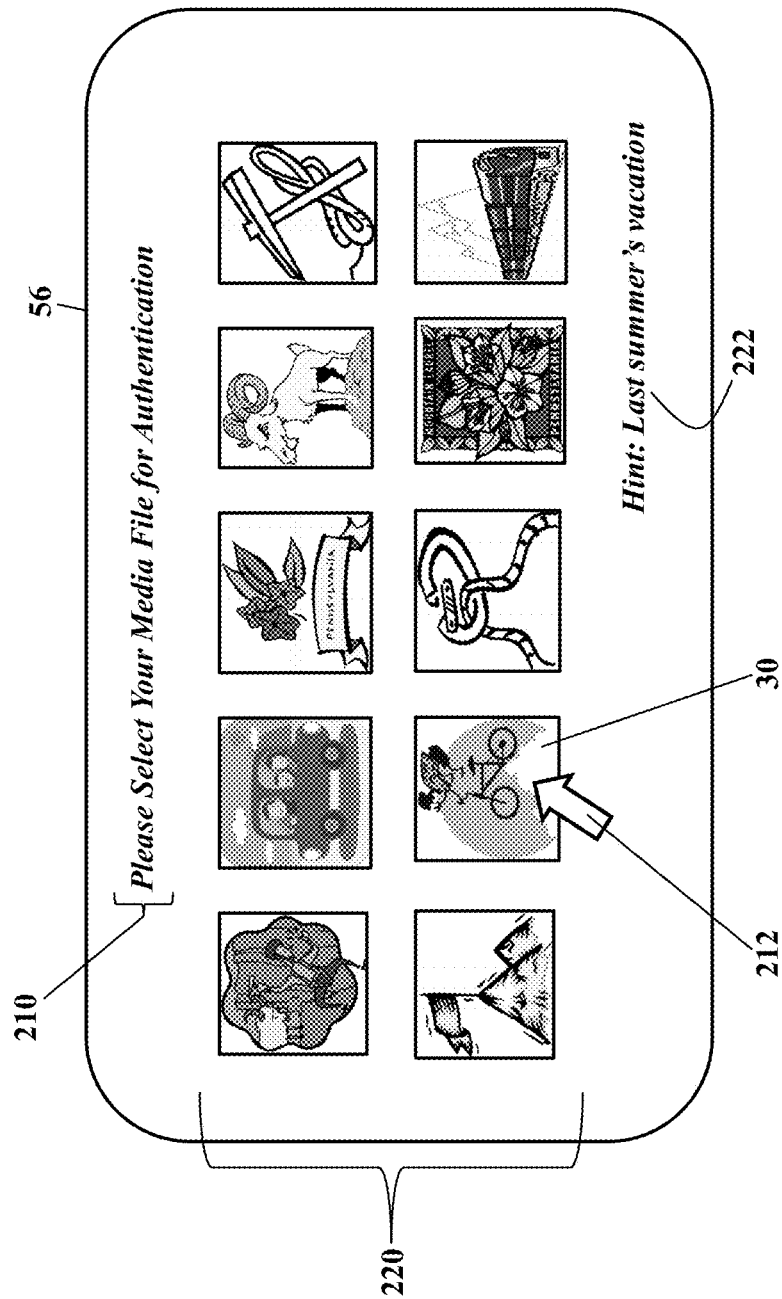

FIGS. 9 and 10 are schematics illustrating the graphical user interface 56 for the authentication application 52, according to exemplary embodiments. FIG. 9 illustrates user selection of the media file 30. The graphical user interface 56 visually presents a prompt 210 for authentication. The user manipulates a cursor 212 and selects a file location 214 where the media file 30 may be retrieved. The user then moves the cursor 212 and clicks or selects a "Submit" graphical control 216. The authentication application 52 then retrieves the media file 30 from the specified local or remote location 214 and authenticates the media file 30, as the above paragraphs explained.

FIG. 10 illustrates multiple media files. Here the graphical user interface 56 simultaneously displays multiple media files 220, and the user selects the media file 30 desired for authentication. The multiple media files 220 are illustrated in a tiled configuration, with a thumbnail image representing each individual media file 30. Here, then, the authentication application 52 presents a set of thumbnail images or larger pictures. The graphical user interface 56 visually presents the prompt 210, and the user manipulates the cursor 212 and selects the media file 30 to be authenticated. The user is expected to select the media file 30 that meets some or all of the set 28 of criteria. Presuming the set 28 of criteria remains secret, an identity thief finds it difficult to pick the media file 30 that matches the set 28 of criteria. The multiple media files 220 may be retrieved from the user's collection of photos and music, from a public photo/music sharing site, or from some preconfigured and tagged library. The graphical user interface 56 may even present a hint 222 to help clue the user to the correct media file 30.

Figure 11:
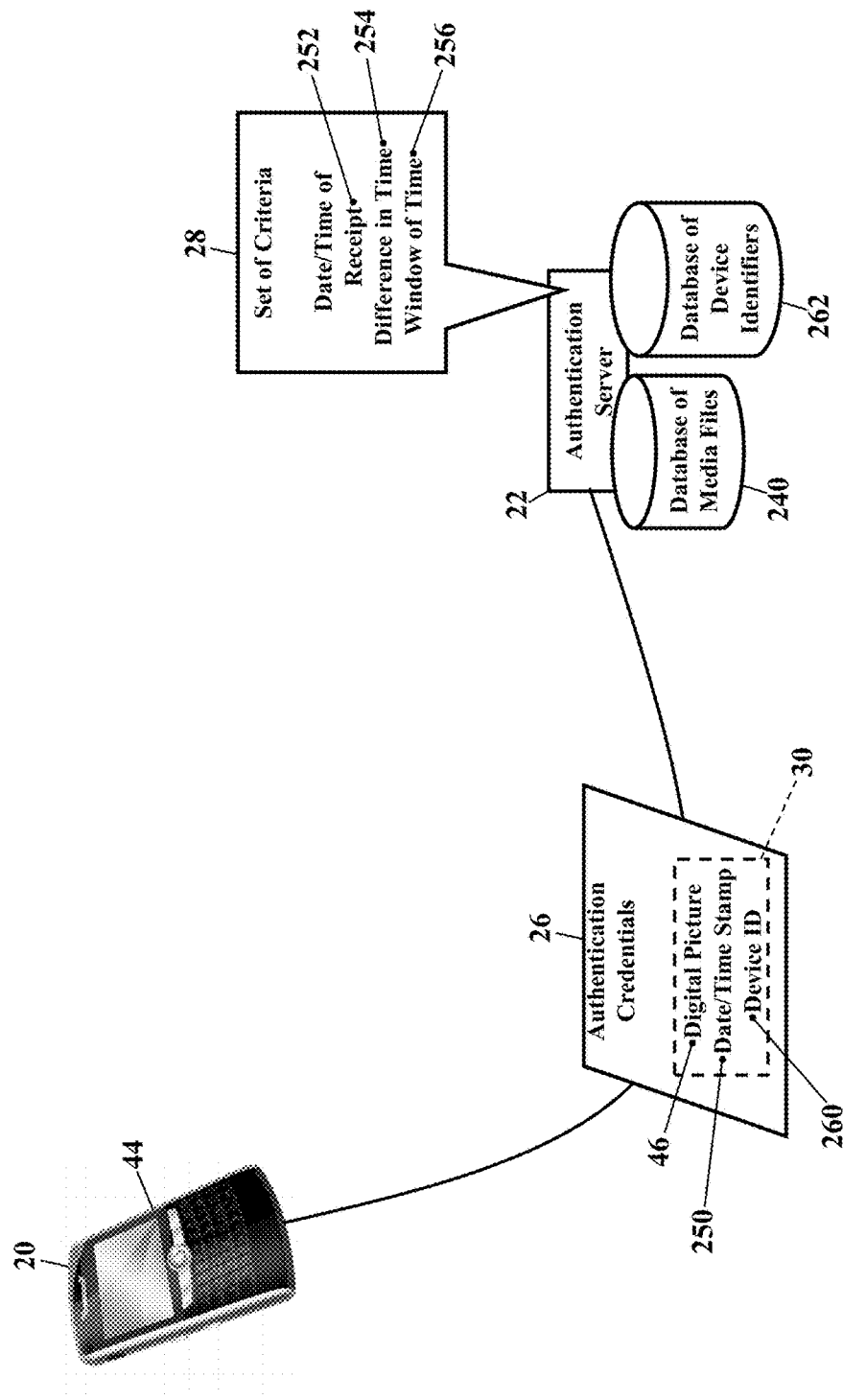
FIG. 11 is a detailed schematic illustrating a digital picture, according to exemplary embodiments.
Figure 12:
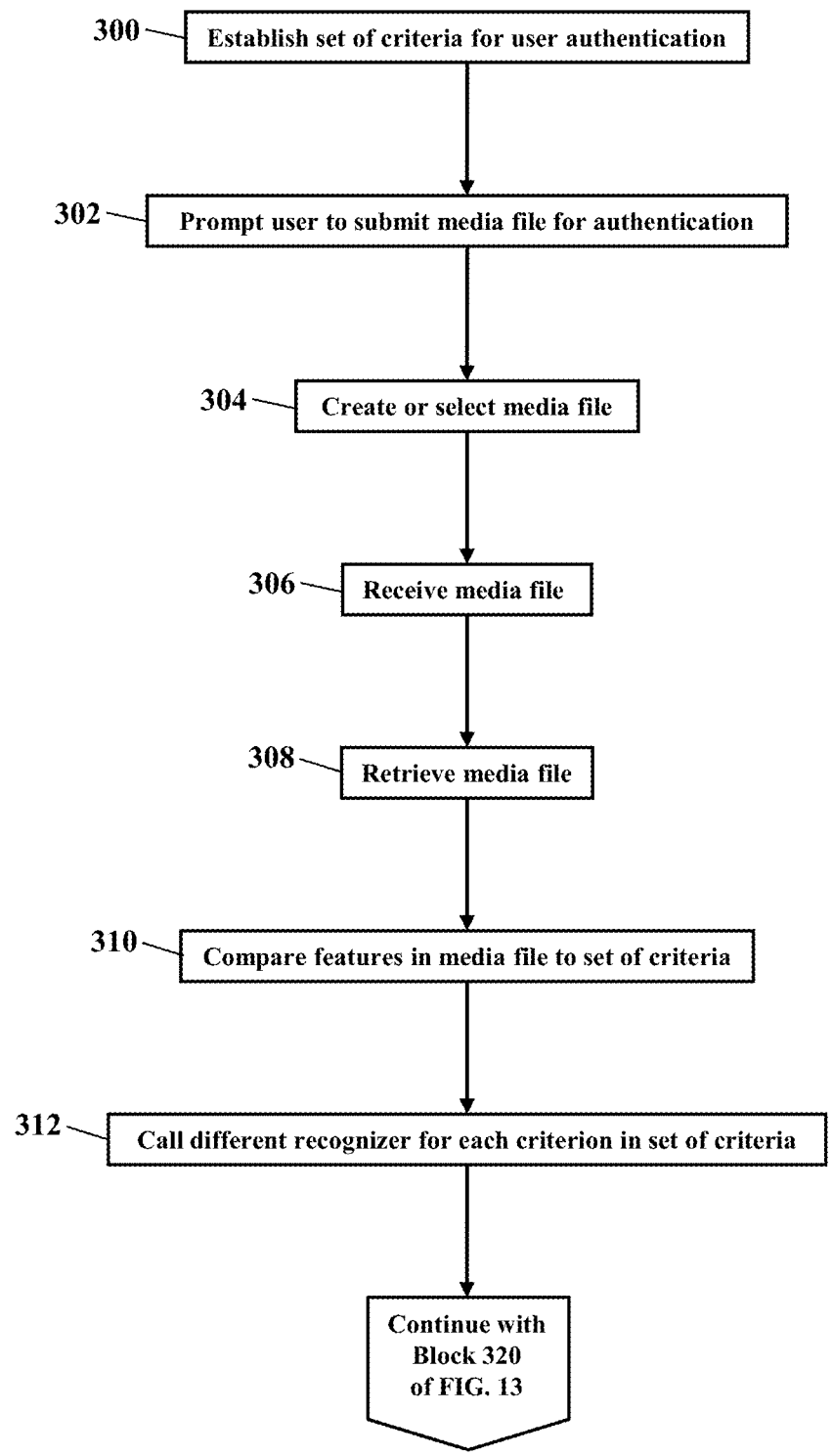
FIGS. 12-15 are flowcharts illustrating a method of authenticating users, according to exemplary embodiments.

FIG. 11 is a detailed schematic illustrating the digital picture 46, according to exemplary embodiments. As earlier paragraphs explained, the user may submit the digital picture 46 to authenticate. The user points the camera phone 44 and creates a picture (or movie and/or audio clip) of the user's surrounding environment that will sufficiently satisfy the set 28 of criteria. The camera phone 44 sends the digital picture 46 to the authentication server 22. The authentication server 22 compares the digital picture 46 to the set 28 of criteria. If the digital picture 46 satisfies the set 28 of criteria, then the client device 20 (e.g., the camera phone 44) is authorized to access the authentication server 22.

Here, though, the set 28 of criteria may require creation of a unique media file 30 for each authentication attempt. When the user wishes to authenticate, the set 28 of criteria may require a unique media file 30 that has never before been compared to the set 28 of criteria. If the digital picture 46 has previously been compared to the set 28 of criteria, then the authentication application 52 may automatically and/or immediately deny authentication. A unique media file 30, in other words, may force the user to create and submit a new digital picture 46 with each authentication attempt. The user could not resubmit the same media file 30. Because a unique media file 30 may be required for each authentication attempt, exemplary embodiments reduce the danger of an attacker replaying the user's authentication by simply resending the same digital picture 46.

As FIG. 11 illustrates, the authentication application 52 may compare each media file 30 that is submitted for authentication to a database 240 of media files. The database 240 of media files may be locally stored in the authentication server 22 or remotely accessed and maintained in the communications network (illustrated as reference numeral 24 in FIG. 1). If the authentication application 52 determines that the media file 30 (such as the digital picture 46) matches a previously submitted media file in the database 240 of media files, then the authentication application 52 may deny authentication. The database 240 of media files, for example, may store filenames, serial numbers, sequence numbers, and/or other alphanumeric indicators of previously submitted media files. If any alphanumeric indicator matches any alphanumeric indicator in the database 240 of media files, then the authentication application 52 may deny authentication. The authentication application 52 queries the database 240 of media files for the alphanumeric indicator associated with the digital picture 46. If the alphanumeric indicator is matched to the entries in the database 240 of media files, then the authentication application 52 may compare the media file 30 to the set 28 of criteria, as the above paragraphs explained. If, however, the alphanumeric indicator is not matched to the entries in the database 240 of media files, the authentication application 52 may deny authentication without comparing the media file 30 to the set 28 of criteria.

The set 28 of criteria may also require a contemporaneous media file 30 for each authentication attempt. When the user submits the digital picture 46 to authenticate, the set 28 of criteria may require that the digital picture 46 be generated or captured contemporaneous to the receipt of the authentication credentials 26. The digital picture 46, in other words, must have been recently created in order to authenticate. As FIG. 11 also illustrates, the media file 30 (e.g., the digital picture 46) may include a date/time stamp 250. The date/time stamp 250 may be added by the user's client device 20 (e.g., the camera phone 44). The date/time stamp 250 may indicate the date and time that the digital picture 46 (or video movie or audio clip) was created, captured and/or generated by the user's camera phone 44. When the authentication server 22 receives the digital picture 46, the authentication server 22 may compare the date/time stamp 250 associated with the digital picture 46 to a date and time 252 of receipt at the authentication server 22. The authentication application 52 determines a difference 254 in time between the date/time stamp 250 and the date and time 252 of receipt. The authentication application 52 compares the difference 254 in time to a window 256 of time. The window 256 of time is the maximum difference permitted between the date/time stamp 250 and the date and time 252 of receipt. The window 256 of time may thus be some threshold time difference that is permitted for authentication. If the difference 254 in time (between the date/time stamp 250 associated with the digital picture 46 and the date and time 252 of receipt) is less than or equal to the window 256 of time, then the media file 30 (e.g., the digital picture 46) may be considered contemporaneous for authentication. The authentication application 52 may then compare the media file 30 to the set 28 of criteria, as the above paragraphs explained. If the difference 254 in time is greater than the window 256 of time, then the media file 30 (e.g., the digital picture 46) may not be contemporaneous (the media file 30 is stale), so the authentication application 52 may deny authentication without comparing the media file 30 to the set 28 of criteria.

The set 28 of criteria may also require a known client device, according to exemplary embodiments. When the user submits the digital picture 46 to authenticate, the set 28 of criteria may require that the digital picture 46 be created from a known client device. The digital picture 46, in other words, must have been captured or generated by a known make and/or model of device. As FIG. 11 also illustrates, the media file 30 (e.g., the digital picture 46) may include a device identification (illustrated as "Device ID") 260. The device identification 260 may be added by the user's client device 20 (e.g., the camera phone 44), and the device identification 260 uniquely identifies the client device 20. The device identification 260 may include a manufacturer and/or model number associated with the client device 20. The device identification 260 may include a serial number or any alphanumeric sequence that may uniquely identify the client device 20. When the authentication server 22 receives the digital picture 46, the authentication server 22 may compare the device identification 260 associated with the digital picture 46 to a database 262 of device identifiers. The database 262 of device identifiers stores device identifiers for which authentication is permitted. The database 262 of device identifiers may store a single device identification, or multiple device identifiers, from which the authentication application 52 will permit authentication. The authentication application 52 queries the database 262 of device identifiers for the device identification 260 associated with the digital picture 46. If the device identification 260 is matched to the entries in the database 262 of device identifiers, then the media file 30 was created by a known client device. The authentication application 52 may compare the media file 30 to the set 28 of criteria, as the above paragraphs explained. If, however, the device identification 260 is not matched to the entries in the database 262 of device identifiers, the authentication application 52 may deny authentication without comparing the media file 30 to the set 28 of criteria. Here, then, exemplary embodiments may require that the digital picture 46 be created by a particular make/model of the camera phone 44 that has been previously associated with the authenticating user. If the device identification 260 is unknown, authentication may be denied.

FIGS. 12-15 are flowcharts illustrating a method of authentication, according to exemplary embodiments. The set 28 of criteria is established for user authentication (Block 200). A user is prompted to submit the media file 30 for authentication (Block 202). The media file 30 may be created, or the media file 30 may be selected from a menu of multiple media files (Block 204). The user's selection of the media file is received (Block 206) and retrieved (Block 208). Features in the selected media file 30 are compared to the set 28 of criteria for authentication (Block 210). A different recognizer may be called for each criterion in the set 28 of criteria (Block 212).

Figure 13:
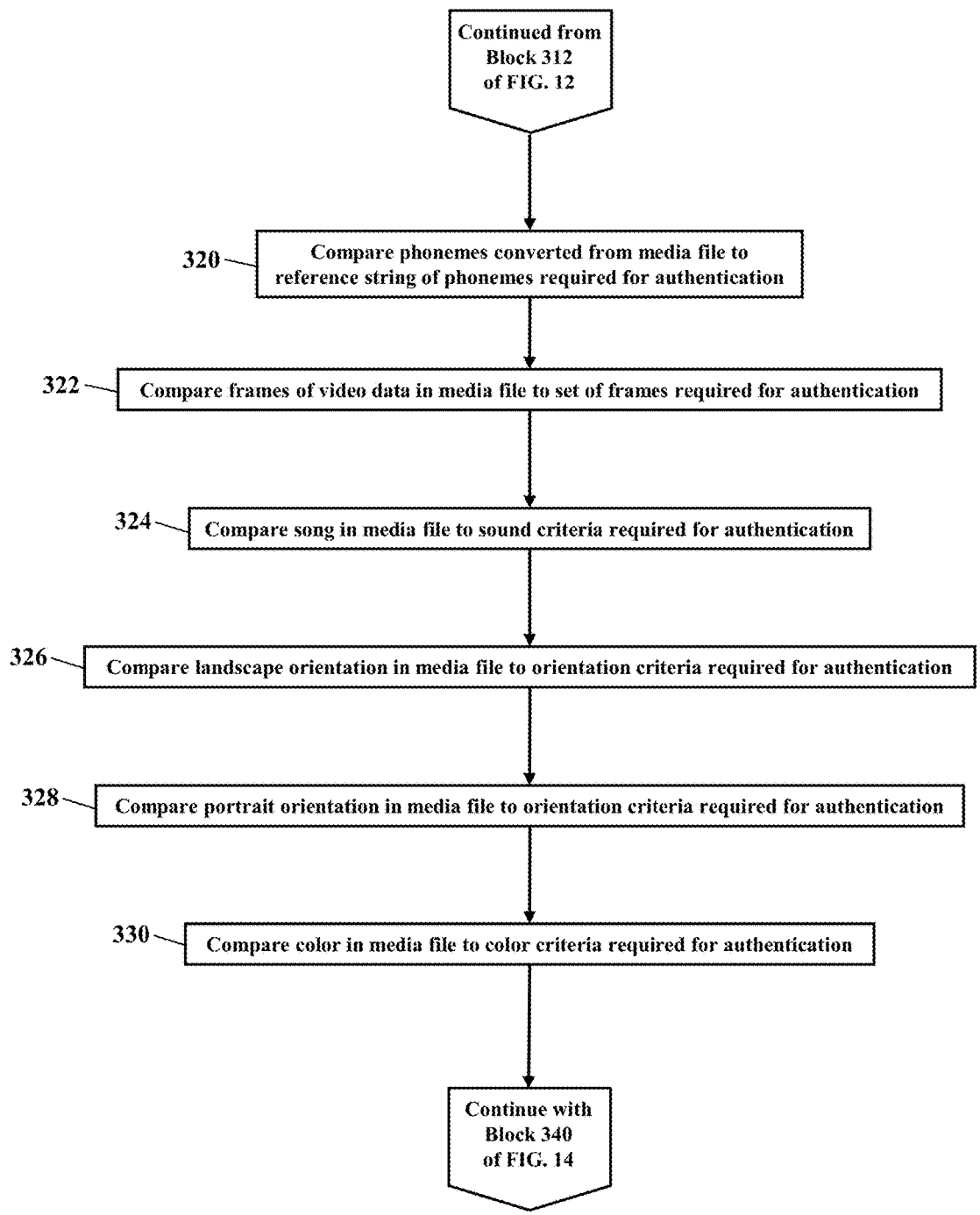

The flowchart continues with FIG. 13. Phonemes in the selected media file 30 may be compared to the reference string 142 of phonemes that is required for authentication (Block 220). Frames of video data in the selected media file 30 may be compared to a set of frames that is required for authentication (Block 222). A song in the selected media file 30 may be compared to the sound criteria 188 that is required for authentication (Block 224). Landscape orientation (Block 226) and/or portrait orientation (Block 228) in the selected media file 30 may be compared to the orientation criteria 190 that is required for authentication. Color in the selected media file 30 may be compared to the color criteria 180 that is required for authentication (Block 230).

Figure 14:
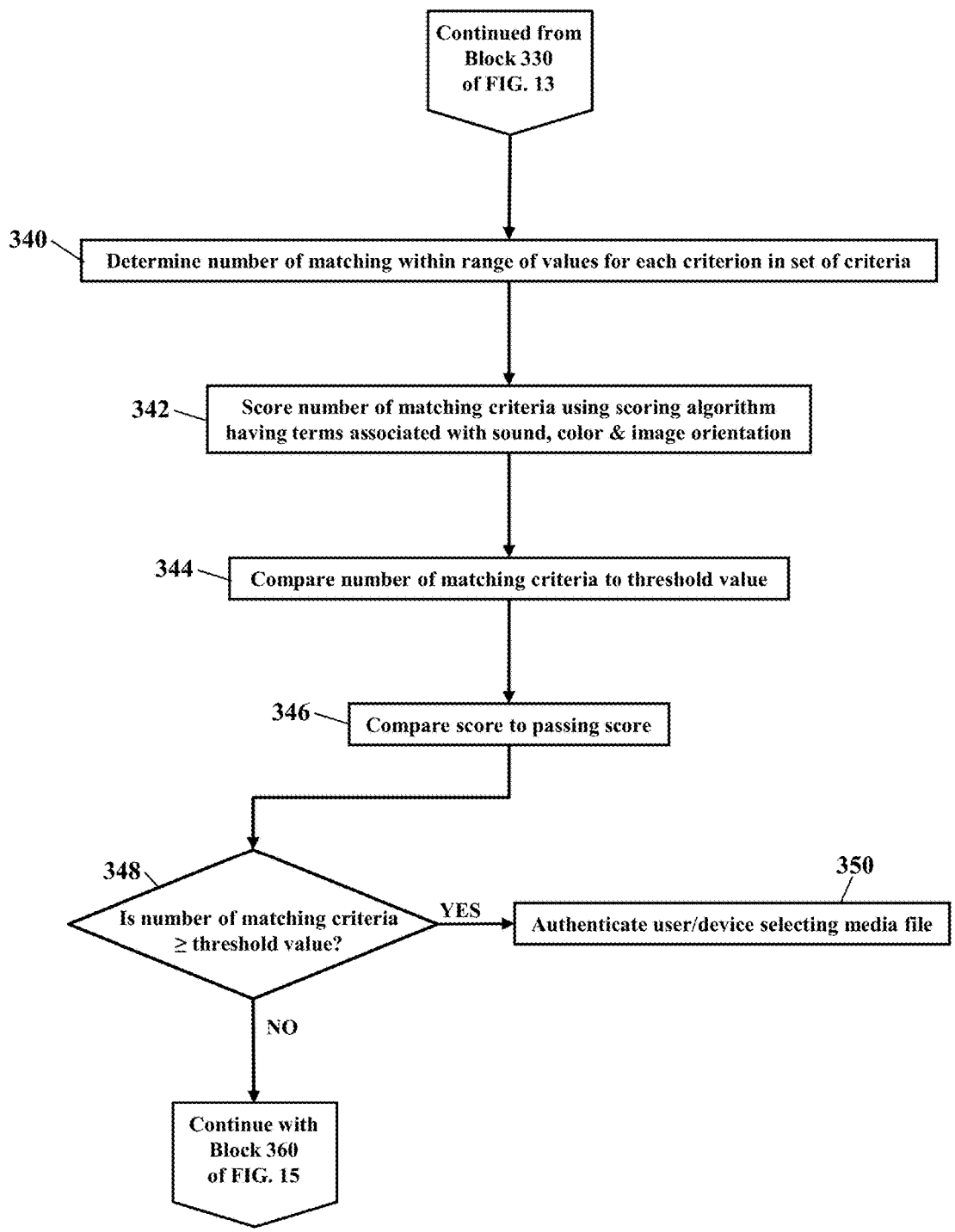

The flowchart continues with FIG. 14. The number 86 of matching criteria is determined that are within the range 112 of values for each criterion in the set 28 of criteria (Block 240). The number of matching criteria may be scored using the scoring algorithm 122 having terms associated with sound, color, and image orientation (Block 242). The number 86 of matching criteria are compared to the threshold value 84 (Block 244). The score 124 may be compared to the passing score 120 (Block 246). When the number 86 of matching criteria equals or exceeds the threshold value 84 (Block 248), then the user or device that selected the media file 30 may be authenticated (Block 250).

Figure 15:
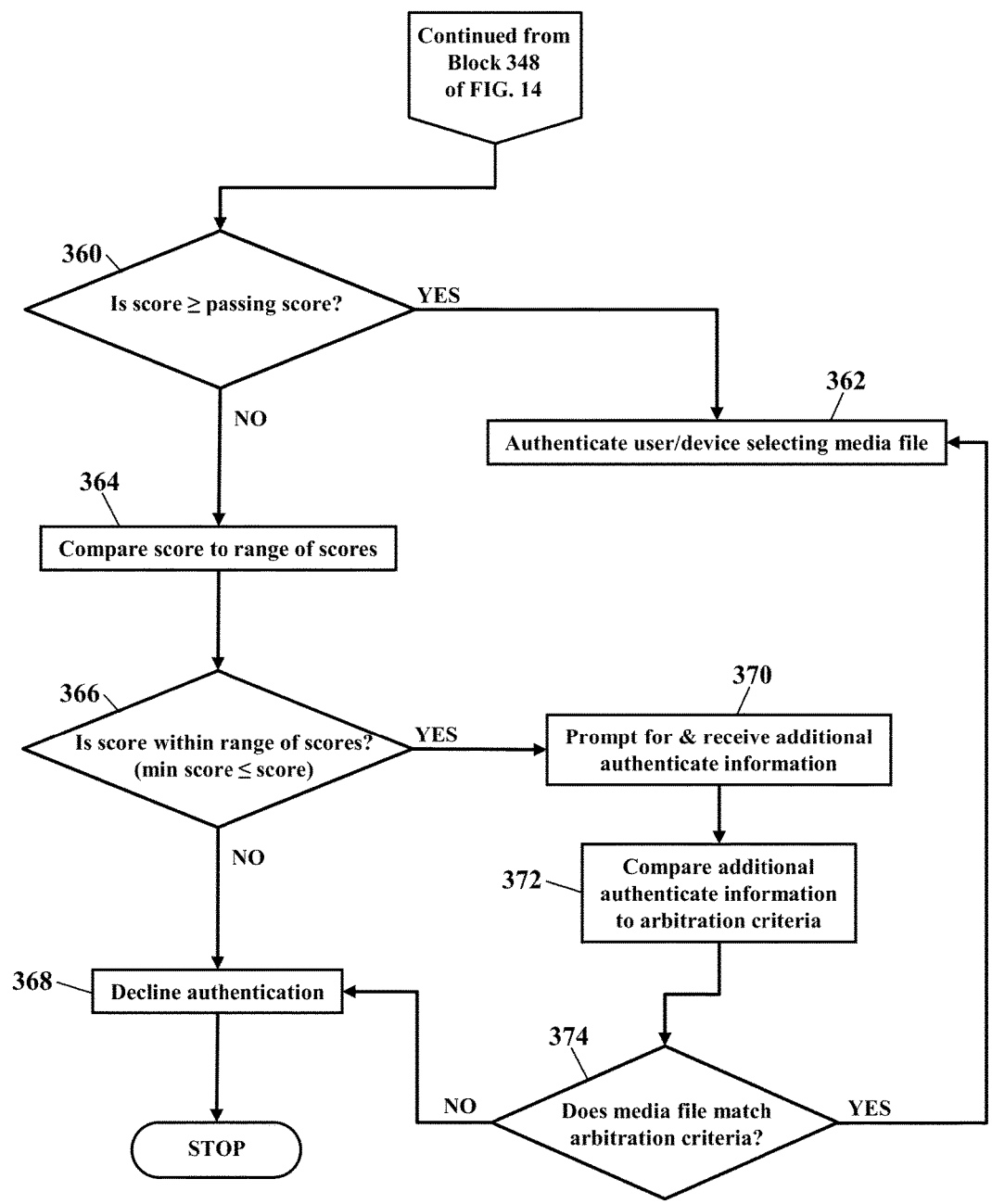

If the number 86 of matching criteria is less than the threshold value 84 (Block 248), then the flowchart continues with FIG. 15. If the score 124 equals or exceeds the passing score 120 (Block 260), then the media file 30 authenticates the submitting user/device (Block 262). If, however, the score 124 is less than the passing score 120 (Block 260), then the score 124 may be compared to the range 132 of scores (Block 264). If the score 124 is outside the range 132 of scores (Block 266), then authentication may be denied (Block 268). If the score 124 is within the range 132 of scores (Block 266), then the client device 20 may be prompted to submit the additional authentication information 130 (Block 270). The additional authentication information 130 is compared to the arbitration criteria 150 (Block 272). If the additional authentication information 130 matches the arbitration criteria 150 (Block 274), then the media file 30 authenticates the submitting user/device (Block 262). If, however, the additional authentication information 130 fails to match the arbitration criteria 150 (Block 274), then authentication may be declined (Block 268).

Figure 16:
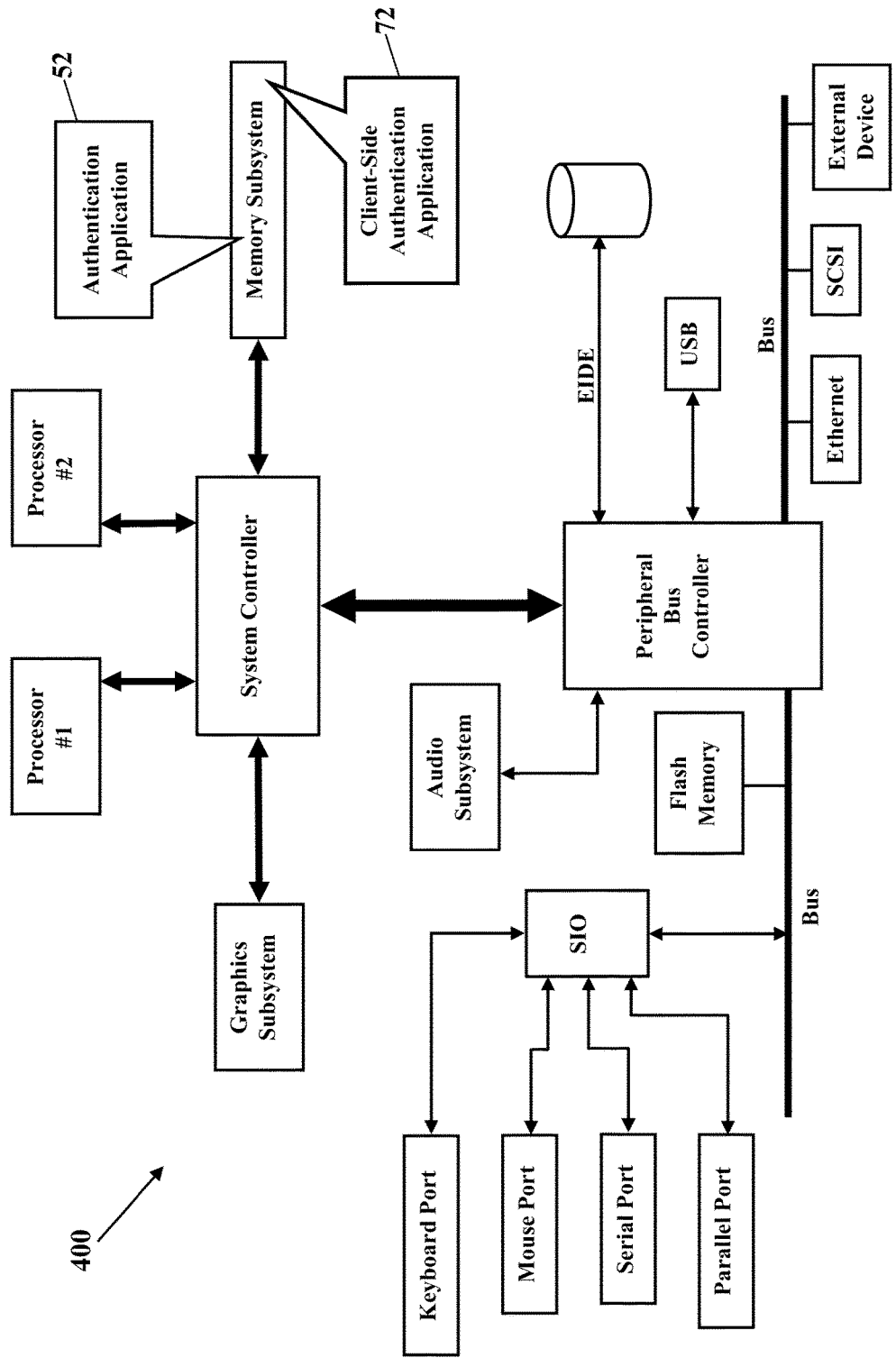
FIG. 16 is a schematic illustrating a processor-controlled device, according to exemplary embodiments.

FIG. 16 is a schematic illustrating still more exemplary embodiments. FIG. 16 is a generic block diagram illustrating the authentication application 52 and the client-side authentication application 72 operating within a processor-controlled device 400. As the previous paragraphs explained, the authentication application 52 (and the client-side authentication application 72) may operate in any processor-controlled device 400. FIG. 16, then, illustrates the authentication application 52 and the client-side authentication application 72 stored in a memory subsystem of the processor-controlled device 400. One or more processors communicate with the memory subsystem and execute the authentication application 52 and/or the client-side authentication application 72. Because the processor-controlled device 400 is well-known to those of ordinary skill in the art, no detailed explanation is needed.

Figure 17:
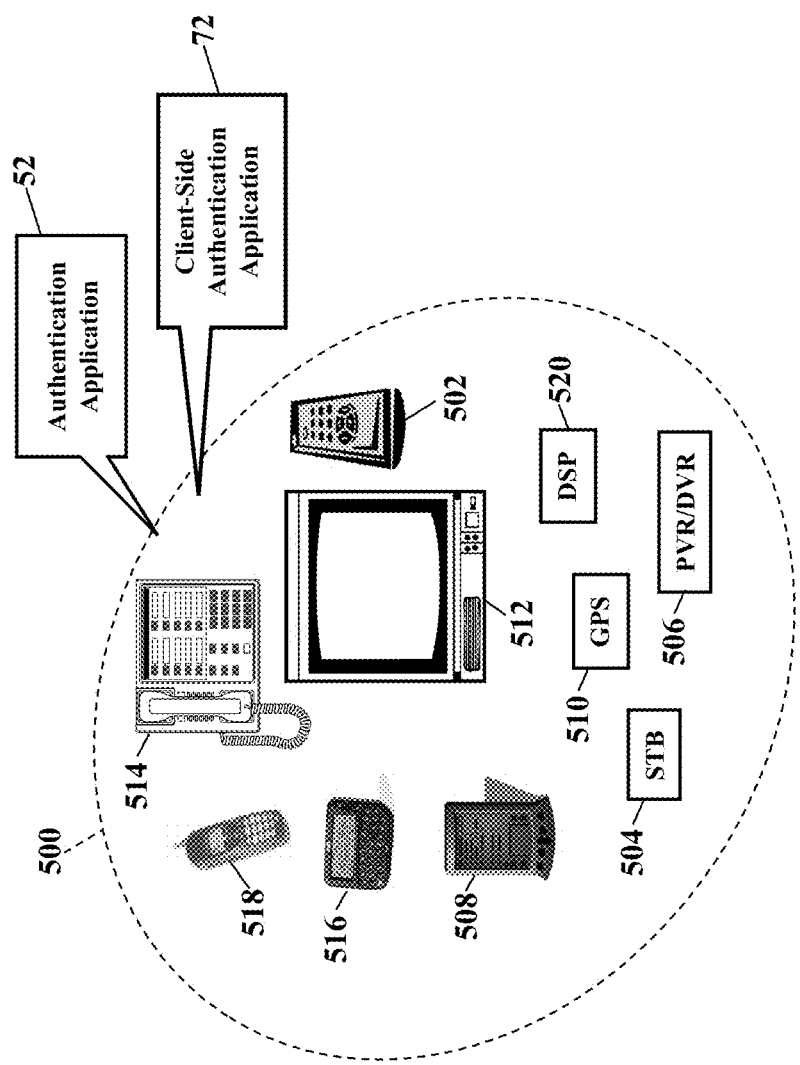
FIG. 17 depicts other possible operating environments for additional aspects of the exemplary embodiments.

FIG. 17 depicts other possible operating environments for additional aspects of the exemplary embodiments. FIG. 17 illustrates the authentication application 52 and the client-side authentication application 72 operating within various other devices 500. FIG. 17, for example, illustrates that the authentication application 52 and/or the client-side authentication application 72 may entirely or partially operate within a remote control 502, a set-top box ("STB") (504), a personal/digital video recorder (PVR/DVR) 506, a personal digital assistant (PDA) 508, a Global Positioning System (GPS) device 510, an interactive television 512, an Internet Protocol (IP) phone 514, a pager 516, a cellular/satellite phone 518, or any computer system, communications device, or processor-controlled device utilizing the processor 50 and/or a digital signal processor (DP/DSP) 520. The device 500 may also include watches, radios, vehicle electronics, clocks, printers, gateways, mobile/implantable medical devices, and other apparatuses and systems. Because the architecture and operating principles of the various devices 500 are well known, the hardware and software componentry of the various devices 500 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for authenticating users, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a server, a video file sent for via the Internet from a client device, the video file submitted as an authentication credential for an authentication;
   retrieving, by the server, a set of criteria associated with the authentication;
   comparing, by the server, features generated by the video file to the set of criteria associated with the authentication;
   determining, by the server, that the features generated by the video file satisfy an image orientation and a boundary associated with the set of criteria;
   generating, by the server, a score in response to the features generated by the video file satisfying the image orientation and the boundary associated with the set of criteria;
   comparing, by the server, the score to a passing score associated with the authentication; and
   sending, by the server, an authentication response via the Internet to the client device, the authentication response authenticating the client device in response to the score at least equaling the passing score.

2. The method of claim 1, further comprising retrieving permissive criteria associated with the authentication.

3. The method of claim 2, further comprising comparing the features generated by the video file to the permissive criteria associated with the authentication.

4. The method of claim 3, further comprising summing a count of the features generated by the video file that satisfy the permissive criteria associated with the authentication.

5. A system, comprising:
   a hardware processor; and
   a memory device, the memory device storing code, the code when executed causing the hardware processor to perform operations, the operations comprising:
   receiving an electronic video file submitted by a client device for an authentication;
   retrieving a set of criteria associated with the authentication;
   comparing features generated by the electronic video file to the set of criteria associated with the authentication;
   determining at least one of the features generated by the electronic video file satisfies an image orientation in the set of criteria associated with the authentication;
   determining the at least one of the features generated by the electronic video file satisfies a boundary recognized by the set of criteria associated with the authentication;
   determining a score in response to the image orientation and the boundary satisfying the set of criteria associated with the authentication;
   comparing the score to a threshold value for authenticating the client device; and
   authenticating the client device in response to the score at least equaling the threshold value.

6. A memory device storing code that when executed causes a hardware processor to perform operations, the operations comprising:
   receiving an electronic video file submitted by a client device for an authentication;
   retrieving a set of criteria associated with the authentication;
   comparing features generated by the electronic video file to the set of criteria associated with the authentication;
   determining at least one of the features generated by the electronic video file satisfies an image orientation and a boundary criterion in the set of criteria associated with the authentication;
   determining a score in response to the image orientation and the boundary criterion satisfying the set of criteria associated with the authentication;
   comparing the score to a threshold value for authenticating the client device; and
   authenticating the client device in response to the score at least equaling the threshold value.

* * * * *